United States Patent
Schick

(10) Patent No.: US 7,271,919 B2
(45) Date of Patent: Sep. 18, 2007

(54) CONFOCAL DISPLACEMENT SENSOR

(75) Inventor: Anton Schick, Velden (DE)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 10/660,604

(22) Filed: Sep. 12, 2003

(65) Prior Publication Data

US 2004/0051879 A1  Mar. 18, 2004

(30) Foreign Application Priority Data

Sep. 12, 2002  (DE) ............................... 102 42 373

(51) Int. Cl.
G01B 11/24 (2006.01)
(52) U.S. Cl. ..................... 356/609; 356/624
(58) Field of Classification Search ............... 356/609, 356/624; 250/201.3, 227.29; 385/12, 33
See application file for complete search history.

(56) References Cited

U.S. PATENT DOCUMENTS

| | | | |
|---|---|---|---|
| 3,788,741 A * | 1/1974 | Buechler | 356/609 |
| 4,115,005 A * | 9/1978 | Murata | 356/609 |
| 4,585,349 A * | 4/1986 | Gross et al. | 356/624 |
| 4,629,324 A * | 12/1986 | Stern | 356/609 |
| 4,666,304 A * | 5/1987 | Davies | 356/624 |
| 4,965,441 A * | 10/1990 | Picard | 250/201.3 |
| 5,017,796 A * | 5/1991 | Makita | 250/559.38 |
| 5,248,876 A | 9/1993 | Kerstens et al. | |
| 5,737,084 A * | 4/1998 | Ishihara | 356/609 |
| 6,917,421 B1 * | 7/2005 | Wihl et al. | 356/624 |

FOREIGN PATENT DOCUMENTS

EP    0835423 B1   4/1998

* cited by examiner

*Primary Examiner*—Richard A. Rosenberger
(74) *Attorney, Agent, or Firm*—Harness, Dickey & Pierce

(57) ABSTRACT

A confocal displacement sensor is created in which, through a graduated arrangement of optical outputs relative to an imaging optic in the object area of displacement sensor, real images of the optical outputs can be created at different heights. A surface to be measured, which is located in the area between the real images, at least partly scatters back illumination beams emitted by the optical outputs. As such, two measurement beams are created for which the intensities are each recorded by a light detector. This is done by interpolation between the measured light intensities. The height position of the scanned points of the surface can be calculated and the surface to be measured can be measured simultaneously at a number of scanning points. Two planar light sources are preferably used for light generation and two planar high-resolution cameras for light detection.

24 Claims, 3 Drawing Sheets

CONFOCAL DISPLACEMENT SENSOR

The present application hereby claims priority under 35 U.S.C. §119 on German patent application number DE 10242373.3 filed Sep. 12, 2002, the entire contents of which are hereby incorporated herein by reference.

FIELD OF THE INVENTION

The invention generally relates to a sensor for fast optical displacement measurement according to the confocal imaging principle.

BACKGROUND OF THE INVENTION

With ever-increasing integration density on electronic modules, the number of connections of electronic components is constantly rising. To address this trend installation and contacting methods have been developed by which the components are contacted using balls of solder on the underside of the components with connecting surfaces on a substrate to be equipped. These types of component are typically known as Ball-Grid-Arrays (BGA) or Flip-Chips. To guarantee reliable contacting the connections must be inspected precisely before component placement, since faulty connections that lead to a bad electrical contact between component and the connecting surfaces can no longer be detected.

To enable electronic modules to be manufactured at low cost and with high quality a large number of demands are imposed on modern inspection systems for electrical components. The inspection system must thus be in a position to determine the parameters of the inspection object, such as typically its dimensions, the coplanarity of the electrical connections or the pitch of the connections. Furthermore it should be possible to carry out the inspection within the shortest possible time, and at low cost, as a non-contact process. These strict demands for the measurement of three-dimensional surfaces can as a rule only be fulfilled by an optical method for measuring surface profiles. Optical methods of inspection known in this context are delay methods, triangulation methods and confocal methods.

The delay methods in which the distance between sensor and the surface to be measured are determined from the delay of a pulse of light reflected back from the surface, also include in this con-text what are known as the interferometric method. This can achieve higher spatial resolutions by overlaying coherent beams of light. The interference signal is created by a mechanical movement of an optical element of an interferometer or. a modification of the optical path length within an Interferometer. In this case, especially for a surface image recording of a surface to be measured relatively long measurement times are required.

The Triangulation method also includes all methods for which the direction of illumination or projection direction deviates from the direction of observation. This also includes methods that operate by way of structured illumination (e.g. moiré method) since the deformation of the pattern projected on the surface to be recorded from which deformation the height position of individual surface points is calculated, can only be observed from a specific angle of triangulation. The measurement of three-dimensional surface profiles by way of structured illumination ideally requires isotropically scattering object surfaces, since anisotropically scattering surfaces, i.e. at least slightly reflective surfaces cannot reflect the deformation of the structured illumination through the three-dimensional surface because of a mirror lens effect. Since the reliability of the measurement results is very strongly dependent on the reflection behavior of the surface to be measured, solder ball inspection using structured illumination is generally impossible or extremely difficult to implement.

The triangulation method also includes so-called triangulation methods in which the surface to be measured is scanned with a laser beam and point of incidence of the laser beam is recorded by a camera. Fast deflection units, such as rotating polygon mirrors or galvanometer scanners are used here for defined deflection of the laser beam. Alternatively a relative movement between the object and the laser beam can be created by a movement of the object to be measured. Measurements by laser triangulation have the disadvantage that a number of surface points cannot be scanned separately but only in sequence one after the other, so that the resulting test times are corresponding long.

The outstanding features of confocal optical methods for calibrating three-dimensional surfaces are high resolution and high levels of robustness with regard to scattered light created by secondary reflections. Confocal optical methods have the further advantage that surface measurement can be undertaken coaxially so that shadowing problems by illumination light falling on the surface at an angle or by observation at an angle to the surface do not occur. Confocal microscopy, which has been known for some time, thus represents a very precise but slow method for three-dimensional surface measurement Conventional confocal displacement sensors also have the disadvantage that a periodic relative movement between the sensor and the surface to be measured is required, so that as result of the of the mass inertia of the masses to be moved, the scanning rate is additionally restricted.

A modified confocal sensor for three-dimensional surface measurement is known from EP 835423 B1 which allows a rapid measurement of the surface through a rapid shift of focus is effected by a mechanically moved retro-reflector using a linear arrangement of plurality of laser beams The image recording is thus comparable with a line camera, by which by a movement of the object to be measured and or the camera in a direction at right angles to the camera line endless images can be recorded in principle. For this reason the modified confocal sensor is also suitable for measurement of larger objects such as wafers or substrates. Since the width of the image is determined by the length of the scanned line, larger image areas must be measured by meander-type scanning of the surface. The disadvantage of the modified confocal sensor is that the required focus shift is generated by a movement of the retro-reflector, so that although a smaller mass has to be moved compared with conventional confocal displacement sensors, the mass inertia of the moved retro-reflector still limits the scanning rate.

SUMMARY OF THE INVENTION

An object of an embodiment of the invention is thus to create a sensor for fast optical displacement measurement in accordance with the confocal imaging principle which requires neither a relative movement between sensor and surface to be measured nor a mechanical movement of an optical component of the sensor to measure the distance between the sensor and a point on the surface.

An object may be achieved by a sensor for fast optical displacement measurement in accordance with the confocal imaging principle. An embodiment of the invention is based on the recognition that the distance to a surface to be measured from the sensor can be determined by an interpolation between the backscattering intensities of two measurement beams by an arrangement of real images of two different outputs along the height coordinates that are positioned at different displacements from the imaging optics.

In accordance with an embodiment of the invention, a measuring beam arrives in a optical input in each case and the corresponding intensity is recorded by a light detector assigned to the optical input in each case. Since each of the two optical inputs is located at the same point as an optical output assigned to the optical input, the optical outputs and the optical inputs are automatically arranged confocally to each other in pairs in each case. For this reason the first light detector preferably records the measured light of the first illumination beam reflected back from the surface.

Likewise, the second light detector preferably records the second measured light reflected light of the illumination beam reflected back from the surface. The displacement measurement then particularly delivers a reliable value when the surface to be recorded is located between the two real images of the two optical outputs. In this case, the two intensities are extensively compared to each other so that an interpolation between the two intensities is undertaken. The displacement sensor in accordance with an embodiment of the invention has the advantage over conventional displacement sensors that the displacement can be determined both without a relative movement between the sensor and the surface to be measured and also without a movement of an optical component of the sensor.

It is pointed out that displacement measurement is also possible when the surface to be measured does not lie between the two real images of the optical outputs. In this case the height position of the surface to be measured is not determined by an interpolation, but by an extrapolation. It is further pointed out that the accuracy and/or the measuring range of the displacement sensor can be extended by using one or more graduated pairs, of optical inputs and outputs that are mapped by the imaging optics to a plurality of real images which are also located in their height position relative to the surface to be measured in a graduated arrangement.

In an advantageous development in accordance with an embodiment of the invention, the relative position of the optical inputs or outputs in relation to each other determines the location of the scanning points on the surface to be measured. The simultaneous scanning at various scanning points of the surface to be measured allows greater scanning power so that the surface profile of measurement objects to be measured can be recorded significantly faster.

Another advantageous development in accordance with an embodiment of the invention allows a surface to be scanned at various scanning points arranged along a one-dimensional scanning line. A transverse shift of the object to be measured thus allows a larger surface to be rapidly measured. If the width of the surface to be measured is greater than the length of the scanning line, the measurement object and/or the displacement sensor can be moved in a meandering way transversely to the illumination beams hitting the surface of the object so that in principle any size of surface can be measured with the sensor.

A further advantageous development in accordance with an embodiment of the invention has the advantage that the surface to be measured can be measured simultaneously at a large number of scanning points which are arranged on a two-dimensional scanning surface. This further increases the scanning performance and for the case where the surface to be measured is not greater than the two-dimensional scanning surface, a transverse shift of the measurement object and/or the sensor is no longer necessary since the entire relevant surface can be measured with a single recording.

Since the height resolution of the displacement sensor depends on the cross-sectional surface of the optical outputs or the optical inputs, almost point-shape optical outputs or. optical inputs in accordance with an embodiment with a cross-sectional surface tailored to the wavelength result in a greater resolving capacity.

The use of optical waveguide end surfaces for the optical outputs and the optical inputs in accordance with an embodiment has the advantage that the optical outputs and the optical inputs can be easily adjusted relative to the beam splitter and to the imaging optics. The end surface of an individual optical waveguide then operates as both an optical output and as an optical input, when the other end of the optical waveguide is optically coupled to both a light source as also to a light detector. This can typically be implemented by the other end of the optical waveguide being split up into two part ends, whereby one part end is coupled to the light source and the other part end to the light detector. Likewise the other end of the optical waveguide can be optically coupled by a semitransparent mirror to both the light detector and the light source.

In accordance with another embodiment, the optical outputs and the optical inputs are each implemented using a diaphragm. Here the opening of each diaphragm is optically coupled via a beam splitter both to a light detector and also to a light source. Depending on number and relative arrangement of the optical outputs to be implemented an individual diaphragm, a row of diaphragms or a diaphragm matrix can be used. This has the advantage that the confocal displacement sensor can be implemented as a compact design.

In accordance with another embodiment, monochrome light detectors are used which are significantly cheaper compared to the spectral resolution light detectors not required for use in accordance with the present invention In accordance with another embodiment cameras, preferably CCD cameras or CMOS cameras, are used as light detectors, the use of such cameras being especially advantageous when a majority of first light detectors and a majority of second light detectors are implemented by use of a single high-resolution camera in each case In this case, each first optical input is assigned to at least one or a number of pixels of the first camera and each second optical input is as-signed to at least one or a number of pixels of the second camera. in this way a large number of light detectors can be implemented at low cost. It should be noted that in principle all optical inputs can be implemented by way of a single camera. This is especially advantageous if, as a result of favorable beam guidance of the measurement beams, the first optical inputs in are located in the vicinity of the second optical inputs.

In accordance with another embodiment, a large number of first optical outputs can be implemented with a first light source and a large number of second optical outputs with a second light source. Plane light sources are especially suitable for this purpose in which a surface element of the light source is coupled in each case by way of optical imaging via a further imaging optic and a further beam splitter with an optical output. It should be pointed out that all optical outputs can also be implemented by way of a single light source, which is especially advantageous if, as a result of clever beam guidance the majority of first optical outputs are located in the vicinity of the majority of second optical outputs.

BRIEF DESCRIPTION OF THE DRAWINGS

Further advantages and features of the present invention can be found in the following typical description of the current preferred exemplary embodiments, wherein.

Figure 1:
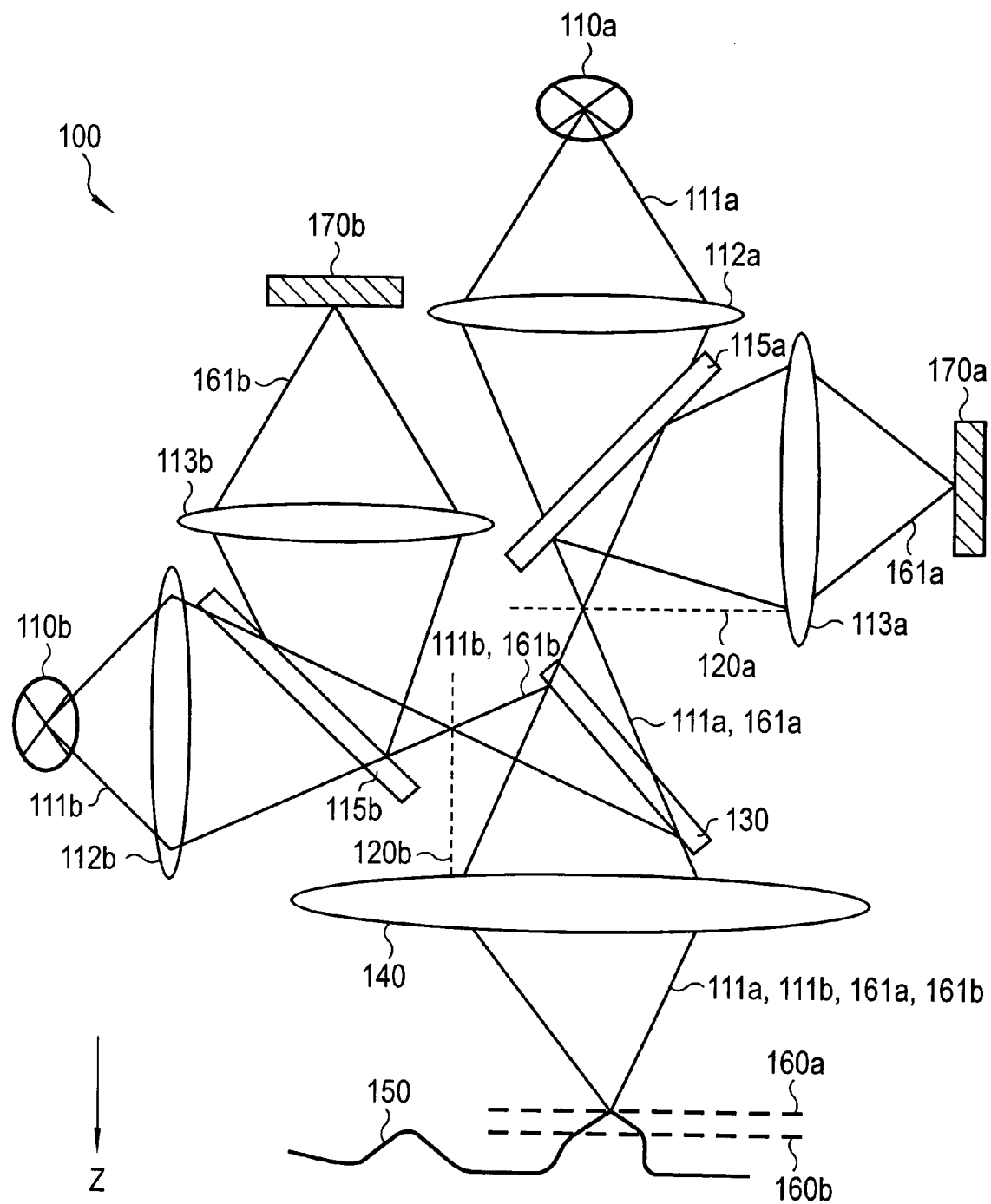
FIG. 1 shows a schematic representation of a confocal displacement sensor with a graduated arrangement of diaphragms.
Figure 3:
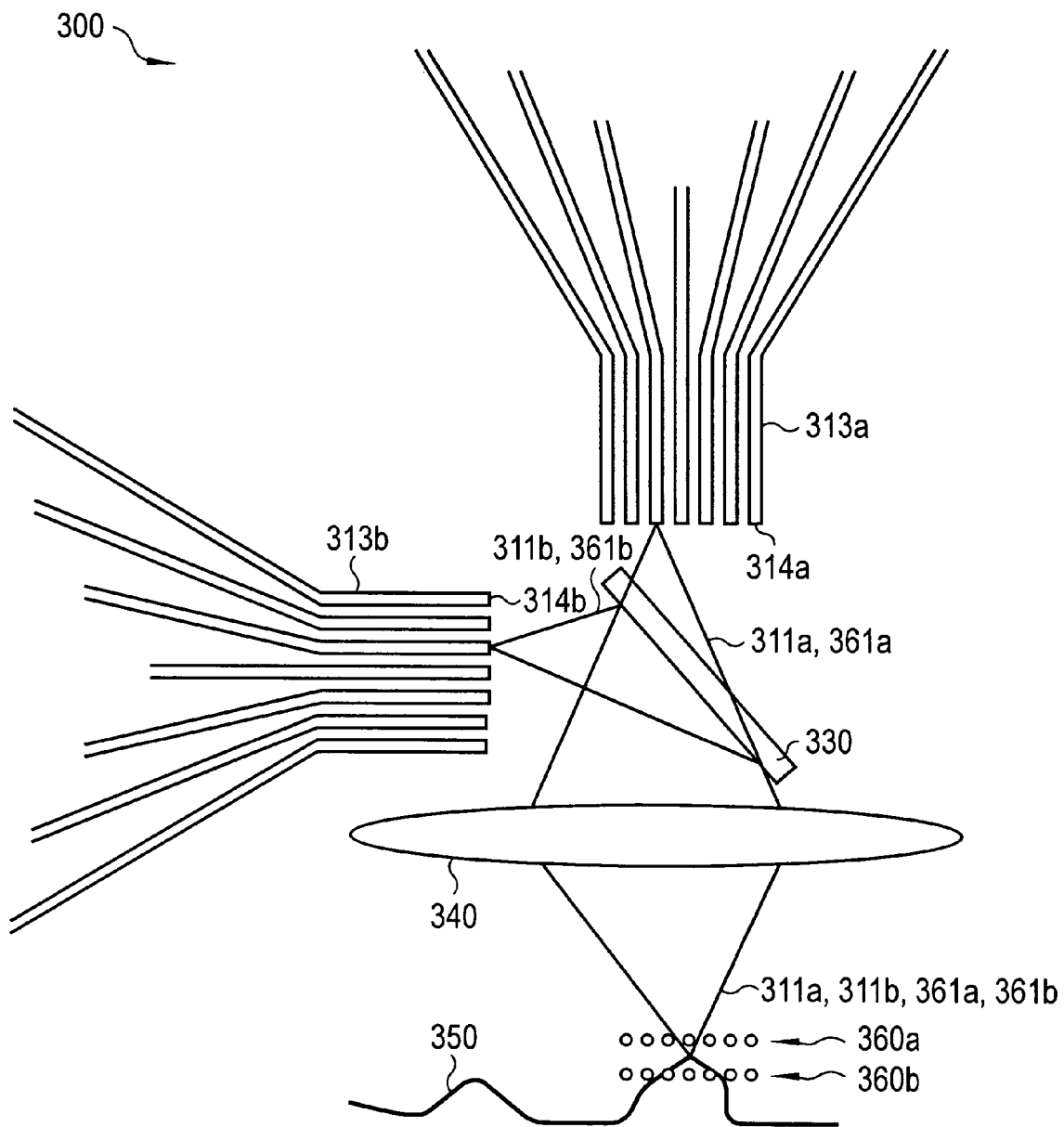
FIG. 3 shows a schematic diagram of a confocal displacement sensor with a graduated arrangement of optical waveguide ends.

At this point it should still be pointed out that the corresponding components in FIGS. 1 and 3 only differ in their first digit.

DETAILED DESCRIPTION OF THE PREFERRED EMBODIMENTS

The displacement sensor 100 shown in FIG. 1 features two diaphragm matrices in a graduated arrangement, a first diaphragm matrix 120a and a second diaphragm matrix 120b. Each opening of the two diaphragm matrices simultaneously serves as an optical output which emits a first illumination beam 11a or a second illumination beam 111b and also as an optical input into which a first measuring beam 161a or a second measuring beam 161b comes. The openings of the two diaphragm matrices 120a or 120b can therefore simultaneously serve both as optical outputs as also as optical inputs, because each opening is optically coupled to both a light source 110a or 110b and also to a camera 170a or 170b.

In accordance with an exemplary embodiment of the invention described here, the optical outputs of the first diaphragm matrix 120a are coupled to a first light source 110a in such a way that a first illumination beam 111a which is emitted by the first light source 110a is mapped by means of an optic 112a to a corresponding opening of the first diaphragm matrix 120a. As can be seen from FIG. 1, a beam splitter 115a is also positioned between the first diaphragm matrix 120a and the optic 112a, by which the first illumination beam 111a is transmitted. The optical inputs of the first diaphragm matrix 120a are optically coupled in a similar way to a first camera 170a, whereby the first measuring beam 16 arriving at the optical input is directed via a reflection to beam splitter 115a and imaged by optic 113a to the first camera 170. In this case the first light source 110a features a large illuminated surface such that all openings of the first diaphragm matrix 120a are illuminated. The first camera 170a, which is a local resolving camera, is positioned in such a way that each opening of the first diaphragm matrix 120a is assigned to one or to a majority of pixels of the first camera 170a, so that the light intensities arriving in the optical inputs of the first diaphragm matrix 120a can be measured independently.

The optical coupling of the optical outputs of the second diaphragm matrix 120b with a second light source 110b as well as the optical coupling of the optical inputs of the second diaphragm matrix 120b with a second camera 170b is undertaken in a similar way to the previously described description of the coupling between the first light source 110a with the optical outputs of the first diaphragm matrix 120a or the optical inputs of the first diaphragm matrix 120a with the first camera 170a. In this case, as can be seen from FIG. 1, two optics 112b and 113b as well as a beam splitter 115b are used, by which a second illumination beam 111b is transmitted and to which a second measuring beam 161b is reflected.

Please note that the position shown in FIG. 1 of displacement sensor 100 can be greatly modified so that the position of the first light source 110a or the second light source 110b can be swapped with the position of the first camera 170a or the second camera 170b. In this case the relevant light source and the optical outputs are coupled via a reflection of the illumination beams 111a or 111b at the beam splitters 115a or 115b and the optical inputs are coupled to both cameras via a transmission of the measurement beams 161a or 161b though the beam splitter 115a or 115b.

The optical outputs of the first diaphragm matrix 120a are imaged after transmission by a beam splitter 130 by means of imaging op-tics 140 in the object area of displacement sensor 100, whereby a real image 160a is created by the first diaphragm matrix 120a at a specific distance from the imaging optics 140. Accordingly, the second diaphragm matrix 120b is imaged after a reflection at beam splitter 130 by way of imaging optics 140 to a real image 160b of the second diaphragm matrix 120b. Because of the graduated arrangement of the two diaphragm matrices 120a and 120b the two real images 160a and 160b are produced at a different distance from the imaging optic 140.

If a surface to be measured 150 is now located in the area between the real images 160a and 160b, the surface is illuminated, depending on its height position with different illumination intensities by the first illumination beam 110a and the second illumination beam 110b. This is because the surfaces illuminated by the illumination beams are each a different size.

Because of the confocal arrangement of the optical inputs to the optical outputs, which is fulfilled automatically by the simultaneous coupling of the diaphragm matrix openings with a light source and a camera, the height position of the surface points scanned by the illumination beams 111a and 111b determined the light intensities, recorded by the two cameras 170a and 170b. An interpolation of the light intensities measured with the two cameras 170a and 170b enables the precise height of surface 150 in the area between the real image 160a and the real image 160b to be calculated.

The calculation of the height position of a scanning point is explained below using the example shown in FIG. 2. In the coordinate system shown, the light intensity scattered back from a scanning point is shown depending on the height coordinates z. A first intensity curve 280a illustrates the intensity of a measurement beam 161a scattered back from a surface point if the corresponding surface point is shifted along the height coordinate z. The same applies to the second intensity curve 280b.

Figure 2:
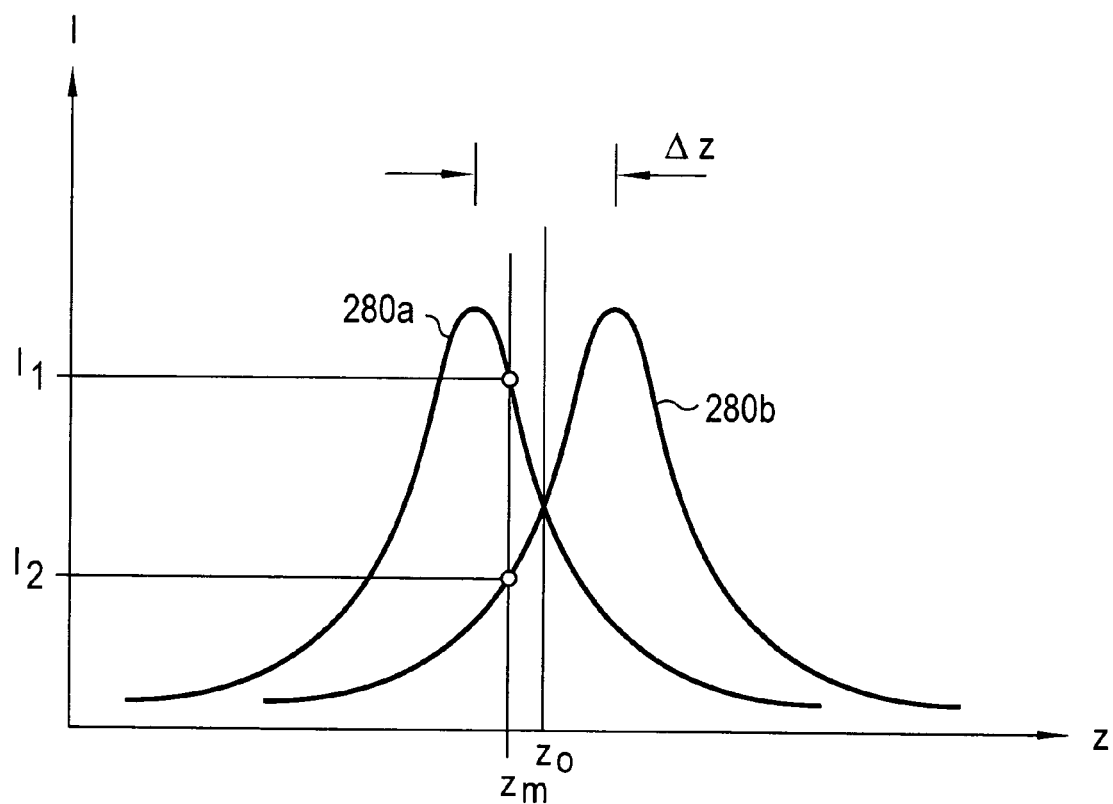
FIG. 2 illustrates determining the height position of a scanning point.

As can be seen from FIG. 2, the two intensity processes 280a and 280b can be described in a pretty good approximation by a Gauss curve in each case. The relative distance of the two Gauss curves 280a and 280b along the height coordinates z corresponds to the distance between the two real images 160a and 160b. This distance simultaneously defines the height measurement area $\Delta z$. The two Intensity curves 280a and 280b intersect at a height coordinate z0, which precisely represents the mean height position between the two real images 160a and 160b. On the basis of the two measured intensities, a first intensity 1, which is measured by the first camera 170a and a second intensity2, which is measured by a second camera 170b, the height position zm of the relevant scanning point can be determined. This process is shown graphically in FIG. 2.

Under the condition that the two intensity processes 280a and 280b are described exactly by Gauss curves, the height position zm can thus be determined analytically. In this case, a linear equation system is resolved with two equations which describe the sequence of the two gauss-shape intensity processes 280a and 280b in each case. The solution of this equation system delivers:

$$z_m = z_0 + [\ln(I_1) - \ln(I_2)] \times (\sigma^2/4\ddot{A}z)$$

In this case ln stands for the natural logarithm and $\sigma$ is the half-value width of the two gaussian intensity curves 280a and 280b.

To allow this formula to be calculated quickly the two logarithms of intensities I1 and I2 can be determined by an evaluation unit not shown in the drawing using a table stored in the evaluation unit.

It should be noted that the interpolation described above, with a known half-value width $\sigma$ is independent of the absolute intensity or the reflectivity of the object surface.

It should also be noted that the displacement sensor 100 can be combined in an advantageous manner with an optical displacement switch (see German Patent Application with official number 101 45 167.9-34, the contents of which are hereby incorporated herein by reference, in their entirety). Here the surface to be recorded is moved in the direction of displacement sensor 100 until the optical displacement switch outputs a signal as soon as the surface to be recorded is preferably located right in the middle between the two real images 160a and 160b. At this point the relative movement between the surface to be recorded on the one side and the displacement sensor 100 and the optical displacement switch on the other side is stopped so that the surface to be recorded is typically correctly positioned for a height and a coplanarity measurement relative to displacement sensor 100.

FIG. 3 shows a displacement sensor 300 in accordance with a further exemplary embodiment of the invention. Here the two diaphragm matrices are replaced by a matrix-shape arrangement of first end surfaces 314a of first optical waveguides 313a or of second end surfaces 314b of second optical waveguides 313b. The end surfaces 314a or 314b of optical waveguides 313a or 313b operate precisely like the first exemplary embodiment of the invention described on the basis of FIG. 1 both as optical outputs and also as optical inputs. The passage of the illumination beams 311a and 311b as well as the measurement beams 361a or 361b through the beam splitter 330 and imaging optic 340 is identical to be beam paths in the displacement sensor 100. Because of the graduated arrangement relative to the imaging optics 340 of the first end surfaces 314a to the second end surfaces 314b real images 360a of the first end surfaces 314a and real images 360b of the second end surfaces 314b are produced at a different distance from the imaging optics 340 in the object area The ends of the optical waveguide 313a or 313b which are turned away from end surfaces 314a or. 314b which are not shown in FIG. 3 are coupled to both a light source and a light detector in each case. This coupling can however also be undertaken by a beam splitter or by the fact that the ends of the optical waveguide 313a and 313b turned away from end surfaces 314a and 314b are each divided up into two end parts, whereby one end part is optically coupled to a light source and the other end part is optically coupled to a light receiver.

The height position zm of the scanning points which are located between the real images 360a and 360b is calculated as described for FIG. 2.

To summarize, the invention creates a confocal displacement sensor 100, in which through a graduated arrangement of optical outputs relative to an imaging optic 140 in the object area of displacement sensor 100 real images 160a, 160b of the optical outputs can be created at different heights. A surface to be measured 150 which is located in the area between the real images 160a and 160b at least partly scatters back illumination beams 111a and 111b emitted by the optical outputs so that two measurement beams 161a and 161b are created for which the intensities are each recorded by a light detector 170a, 170b by interpolation between the measured light intensities the height position of the scanned points of the surface 150 can be calculated. In accordance with a exemplary embodiment of the invention, the surface to be measured 150 can be measured simultaneously at a number of scanning points. Two plane light sources 110a and 110b are preferably used for light generation and two plane high-resolution cameras for light detection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sensor for optical displacement measurement in accordance with a confocal imaging principle, comprising:
   a first optical output adapted to emit a first illumination beam;
   a second optical output adapted to emit a second illumination beam;
   a beam splitter positioned so that the first illumination beam after a transmission through the beam splitter and the second illumination beam after a reflection at the beam splitter are merged;
   an imaging optic, arranged and designed so that the two merged illumination beams are directed onto a surface of a measurement object, whereby, because of different displacements of the first and second optical outputs with respect to the beam splitter, a first real image of the first optical output and a second real image of the second optical output are created at different distances from the imaging optic;
   a first optical input coinciding in location with the first optical output, so that a first measuring beam, created by at least a partial reflection of the first illumination beam, is created on the surface, the first illumination beam arriving in the first optical input after passing through the imaging optic and after a transmission through the beam splitter;
   a second optical input coinciding in location with the second optical output, so that a second measuring beam, created by at least a partial reflection of the second illumination beam, is created on the surface, the second illumination beam arriving in the second optical input after passing through the imaging optic and after a reflection at the beam splitter;
   a first light detector adapted to record an intensity of the first measurement beam;
   a second light detector adapted to record an intensity of the second measurement beam;
   an evaluation unit, coupled to the first and second light detectors, adapted to determine, from a comparison of the intensity of the first measurement beam and the intensity of the second measurement beam, a distance between the sensor and the surface;

at least one further first optical output, positioned adjacent to the first optical output, each adapted to emit a further first illumination beam which, after a transmission through the beam splitter and after passing through the imaging optic, arrives at the surface;

at least one further second optical output, equal in number to the at least one further first optical output and positioned adjacent to the second optical output, each adapted to emit a further second illumination beam which, after a reflection at the beam splitter and after passing through the imaging optic, arrives at the surface;

at least one further first optical input, equal in number to the at least one further first optical output, each of the at least one further first optical input corresponds to one of the at least one further first optical output and coincides in location with the corresponding one of the at least one further first optical output, so that in each case a further first measuring beam is created on the surface by at least partial reflection of a further first illumination beam arriving in the further first optical input after passing through the imaging optic and after a transmission through the beam splitter;

at least one further second optical input, equal in number to the at least one further first optical output, each of the at least one further second optical input corresponds to one of the at least one further second optical output and coincides in location with the corresponding one of the at least one further second optical output, so that in each case a further second measuring beam is created on the surface by at least a partial reflection of a further second illumination beam arriving in the further first optical input after passing through the imaging optic and after reflection at the beam splitter;

at least one further first light detector, equal in number to the at least one further first optical input, each adapted to record the intensity of a further first measurement beam; and at least one further second light detector, equal in number to the at least one further second optical input, each adapted to record the intensity of a further second measurement beam, wherein all further light detectors are also coupled to the evaluation unit so that, from a comparison of the intensities of the further measurement beams, the distance between the sensor and at least one scanning point on the surface, equal in number to the at least one further first optical inputs, is adapted to be determined.

2. A sensor in accordance with claim 1, wherein the optical outputs are arranged in a line.

3. A sensor in accordance with claim 2, wherein the optical outputs and the optical inputs are at least approximately point-shaped.

4. A sensor in accordance with claim 1, wherein the optical outputs are arranged in a matrix.

5. A sensor in accordance with claim 4, wherein the optical outputs and the optical inputs are at least approximately point-shaped.

6. A sensor in accordance with claim 1, wherein the optical outputs and the optical inputs are at least approximately point-shaped.

7. A sensor in accordance with claim 6, wherein the optical outputs and the optical inputs are each an end surface of an optical waveguide.

8. A sensor in accordance with claim 6, wherein the optical outputs and the optical inputs are each an opening of a diaphragm.

9. A sensor in accordance with claim 1, wherein the optical outputs and the optical inputs are each an end surface of an optical waveguide.

10. A sensor in accordance with claim 1, wherein the optical outputs and the optical inputs are each an opening of a diaphragm.

11. A sensor in accordance with claim 1, wherein the light detectors include monochrome light detectors.

12. A sensor in accordance with claim 1, wherein the first light detectors are first cameras and the second light detectors are second cameras.

13. A sensor in accordance with claim 1, wherein
at least a majority of the first optical outputs are optically coupled to a first light source; and
at least a majority of the second optical outputs are optically coupled to a second light source.

14. A sensor in accordance with claim 1, wherein the optical outputs and the optical inputs are each an end surface of an optical waveguide.

15. A sensor for optical displacement measurement in accordance with a confocal imaging principle, comprising:
first optical output means for emitting a first illumination beam;
second optical output means for emitting a second illumination beam;
means for merging the first illumination beam and the second illumination beam;
optic means for directing the two merged illumination beams onto a surface of a measurement object, and for creating a first real image of the first optical output means and a second real image of the second optical output means at different distances from the optic means, the different distances stemming from a first distance between the first optical output means and the means for merging and a second distance between the second optical output means and the means for merging, the first distance is different than the second distance;
a first optical input means, coinciding in location with the first optical output means, for creating a first measuring beam on the surface, created by at least a partial reflection of the first illumination beam, the first illumination beam arriving in the first optical input means after passing through the optic means and after a transmission through the means for merging;
a second optical input means, coinciding in location with the second optical output means, for creating a second measuring beam on the surface, created by at least a partial reflection of the second illumination beam, the second illumination beam arriving in the second optical input after passing through the optic means and after a reflection at the means for merging;
first light detecting means for recording an intensity of the first measurement beam;
a second light detecting means for recording an intensity of the second measurement beam;
evaluation means for determining, from a comparison of the intensity of the first measurement beam and the intensity of the second measurement beam, a distance between the sensor and the surface,
at least one further first optical output means, positioned adjacent to the first optical output means, each for emitting a further first illumination beam which, after a transmission through the means for merging and after passing through the optic means, arrives at the surface;
at least one further second optical output means, equal in number to the at least one further first optical output means and positioned adjacent to the second optical output means, each for emitting a further second illumination beam which, after a reflection at the means for merging and after passing through the optic means, arrives at the surface;

at least one further first optical input means, equal in number to the at least one further first optical output means, each of the at least one further first optical input means corresponds to one of the at least one further first optical output means and coincides in location with the corresponding one of the at least one further first optical output means, so that in each case a further first measuring beam is created on the surface by at least a partial reflection of a further first illumination beam arrives in the further first optical input means after passing through the optic means and after a transmission through the means for merging;

at least one further second optical input means, equal in number to the at least one further first optical output means, each of the at least one further second optical input means corresponds to one of the at least one further second optical output means and coincides in location with the corresponding one of the at least one further second optical output means so that a further second measuring beam is created on the surface by at least a partial reflection of a further second illumination beam, arrives in the further first optical input means after passing through the optic means and a after reflection at the means for merging;

at least one further first light detecting means, equal in number to the at least one further first optical output means, each for recording the intensity of a further first measurement beam; and at least one further second light detecting means, equal in number to the at least one further first optical output means, each for recording the intensity of a further second measurement beam, wherein all further light detecting means are also coupled to the evaluation means so that, from a comparison of the intensities of the further measurement beams, the distance between the sensor and at least one scanning point on the surface, equal in number to the at least one further first optical output means, is adapted to be determined.

16. A sensor in accordance with claim 15, wherein the optical output means are arranged in a line.

17. A sensor in accordance with claim 15, wherein the optical output means are arranged in a matrix.

18. A sensor in accordance with claim 15, wherein the optical output means and the optical input means are at least approximately point-shaped.

19. A sensor in accordance with claim 15, wherein the optical output means and the optical input means are each an end surface of an optical waveguide.

20. A sensor in accordance with claim 15, wherein the optical output means and the optical input means are each an opening of a diaphragm.

21. A sensor in accordance with claim 15, wherein the light detecting means include monochrome light detectors.

22. A sensor in accordance with claim 15, wherein the first light detecting means are first cameras and the second light detecting means are second cameras.

23. A sensor in accordance with claim 15, wherein
at least a majority of the first optical outputs are optically coupled to a first light source; and
at least a majority of the second optical outputs are optically coupled to a second light source.

24. A method of optical displacement measurement using a sensor, in accordance with a confocal imaging principle, comprising:
merging a plurality of first illumination beams and a plurality of second illumination beams;
directing the merged illumination beams onto a surface of a measurement object, and creating a plurality of first real images and a plurality of second real images at different distances, the different distances stemming from a first distance the plurality of first illumination beams travel prior to the merging and a second distance the plurality of second illumination beams travel prior to the merging, the first distance is different than the second distance;
creating first measuring beams on the surface, created by at least a partial reflection of the plurality of first illumination beams; creating second measuring beams on the surface, created by at least a partial reflection of the plurality of second illumination beams; and
determining, from a comparison of an intensity of the first measurement beams and an intensity of the second measurement beams, a distance between the sensor and the surface; and
recording the determined distance, the determined distance being used to generate a surface profile of the measured object.

* * * * *